(12) United States Patent
Velummylum et al.

(10) Patent No.: US 9,137,550 B1
(45) Date of Patent: Sep. 15, 2015

(54) PHYSICAL LOCATION INFLUENCED CACHING

(75) Inventors: Piragash Velummylum, Seattle, WA (US); Jacob Gabrielson, Seattle, WA (US); Bradley E. Marshall, Bainbridge Island, WA (US); Nicholas J. Maniscalco, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 5 days.

(21) Appl. No.: 13/324,766

(22) Filed: Dec. 13, 2011

(51) Int. Cl.
| G06F 15/16 | (2006.01) |
| G06F 15/173 | (2006.01) |
| H04N 21/231 | (2011.01) |
| H04L 29/08 | (2006.01) |
| H04W 4/02 | (2009.01) |

(52) U.S. Cl.
CPC ...... *H04N 21/23106* (2013.01); *H04L 67/2847* (2013.01); *H04L 67/2852* (2013.01); *H04W 4/025* (2013.01)

(58) Field of Classification Search
CPC . H04L 67/2847; H04L 65/60; H04L 67/2842; H04W 4/02; H04W 4/028; H04W 4/025; G06F 17/30902; H04N 21/2306
USPC .......... 709/213–231; 707/1, 999.01; 370/235; 455/456.1–456.3
See application file for complete search history.

(56) References Cited

U.S. PATENT DOCUMENTS

| 7,139,820 | B1 * | 11/2006 | O'Toole et al. ............... 709/223 |
| 8,990,869 | B2 * | 3/2015 | Hasek ............................. 725/92 |
| 2002/0103778 | A1 * | 8/2002 | Saxena ............................... 707/1 |
| 2003/0187984 | A1 * | 10/2003 | Banavar et al. ............... 709/225 |
| 2004/0193648 | A1 * | 9/2004 | Lai et al. ...................... 707/104.1 |
| 2006/0047815 | A1 * | 3/2006 | Hamadi .......................... 709/226 |
| 2006/0277271 | A1 * | 12/2006 | Morse et al. ................... 709/217 |
| 2006/0294223 | A1 * | 12/2006 | Glasgow et al. .............. 709/224 |
| 2007/0002743 | A1 * | 1/2007 | Fan ................................. 370/235 |
| 2009/0083279 | A1 * | 3/2009 | Hasek .............................. 707/10 |
| 2009/0292819 | A1 * | 11/2009 | Kandekar et al. ............. 709/231 |
| 2010/0323715 | A1 * | 12/2010 | Winters ..................... 455/456.1 |
| 2011/0306304 | A1 * | 12/2011 | Forutanpour et al. ....... 455/67.11 |
| 2012/0005364 | A1 * | 1/2012 | Ma et al. ........................ 709/231 |
| 2012/0030305 | A1 * | 2/2012 | Marquess et al. ............. 709/213 |
| 2012/0214503 | A1 * | 8/2012 | Liu et al. ..................... 455/456.1 |
| 2012/0278476 | A1 * | 11/2012 | Agrawal et al. ............... 709/224 |
| 2013/0097309 | A1 * | 4/2013 | Ma et al. ........................ 709/224 |
| 2014/0059156 | A1 * | 2/2014 | Freeman et al. .............. 709/213 |
| 2014/0095943 | A1 * | 4/2014 | Kohlenberg et al. ......... 714/47.3 |

* cited by examiner

*Primary Examiner* — Wing F Chan
*Assistant Examiner* — Raji Krishnan
(74) *Attorney, Agent, or Firm* — Knobbe Martens Olson & Bear LLP (57) ABSTRACT

Aspects of the present disclosure relate to the caching of network content requested by a user of a client computing device during a browsing session. The client computing device's various networks and varying bandwidth can have a negative impact on the browsing session. Caching of network content can enhance performance. For example, network content can be cached on a wireless mobile device so that it is available on the device at a further time without requiring significant bandwidth or, in some cases, even a network connection. Predicting the bandwidth at the time the cached content will be accessed can allow customized caching and an improved user experience.

28 Claims, 9 Drawing Sheets

PHYSICAL LOCATION INFLUENCED CACHING

BACKGROUND

Computing devices and communication networks can be utilized to exchange information. In a common application, a computing device can request content from another computing device via a communication network. For example, a user at a personal computing device can utilize a software browser application, typically referred to as a browser, to request a web page from a server computing device via the internet. In such embodiments, the user computing device can be referred to as a client computing device and the server computing device can be referred to as a content provider.

The communication networks utilized to exchange information can vary widely in availability, coverage area, bandwidth, and the like. Some networks, such as cellular networks like 3G, are available nationwide. Other networks, such as WLANs and other WiFi-based networks, have much smaller coverage areas and may be incompatible with WiFi-based networks elsewhere. The bandwidth on such WiFi networks, however, can be many times greater than the bandwidth available through cellular networks.

Users can connect to such communication networks to request and interact with network content, such as web sites and pages. One or more requests for web pages or other network content may form the basis for predicting which web pages and network content will be requested in the future. The predictions can be used to cache the predicted content before it is requested to minimize latency and other network delays when the content is requested.

From the perspective of a user operating a client computing device, a user experience can be defined in terms of the performance and latencies associated with obtaining network content over a communication network. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to the caching of network content and other network resources requested by, or predicted to be requested by, a user of a client computing device during a browsing session. The systems and methods described herein can apply to various types of network content and other network resources, and therefore the terms "network content," "network resources," "content," and "resources" are used interchangeably and are not intended to limit the application or utility of any claimed system or method.

One problem, among others, presented by the use of mobile wireless computing devices to access network content is that the effective bandwidth can vary substantially across a single wireless network. Another problem is that some wireless mobile devices can potentially connect to different networks during a single browsing session. The various networks and varying bandwidth can have a negative impact on the user experience during the browsing session, particularly when network content is requested in the context of one network connection or bandwidth level and then ultimately viewed, executed, or otherwise accessed in the context of a different network connection or bandwidth level. Caching of network content according to multiple caching policies corresponding to the various network connections and bandwidths can enhance performance. For example, network content can be cached on a wireless mobile device so that it is available on the device at a future time without requiring significant bandwidth or, in some cases, without a network connection. Predicting the bandwidth at the time the cached content will be accessed can allow customized caching and an improved user experience.

Embodiments described herein facilitate the determination of a caching policy based on operating metrics of a computing device accessing network content. It should be noted, however, that the claimed subject matter is not limited to implementations that solve any or all disadvantages noted in any part of this disclosure. Although aspects of the embodiments described herein will focus, for the purpose of illustration, on caching in the context of a remote browsing session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing network content provided by one or more content providers. Illustratively, the browser may access a collection of one or more network resources (e.g., a web page) and embedded resources such as images, video, audio, text, executable code, and other resources. The client computing device can access network content by transmitting requests to a network computing provider. The network computing provider may request the identified network resource(s) from one or more content providers, a content delivery network, or a local or associated cache component, etc. Additionally, the client computing device can transmit metrics to the network computing provider. The metrics can include data associated with the location of the client computing device, the direction in which it is travelling, the bandwidth of its network connection, etc.

Having obtained the requested content (e.g., the requested network resource and embedded resources), the network computing provider can predict network content that the client computing device will request access to in the future. The predicted network content can be cached, either at the network computing provider or at the client computing device. The network computing provider can also identify one or more caching policies for the browsing session, based on the metrics received from the client computing device. The caching policies can specify an amount of predicted network content to cache, a quality or compression level to apply to the network content, and other information about caching network content for an improved user experience.

Figure 1:
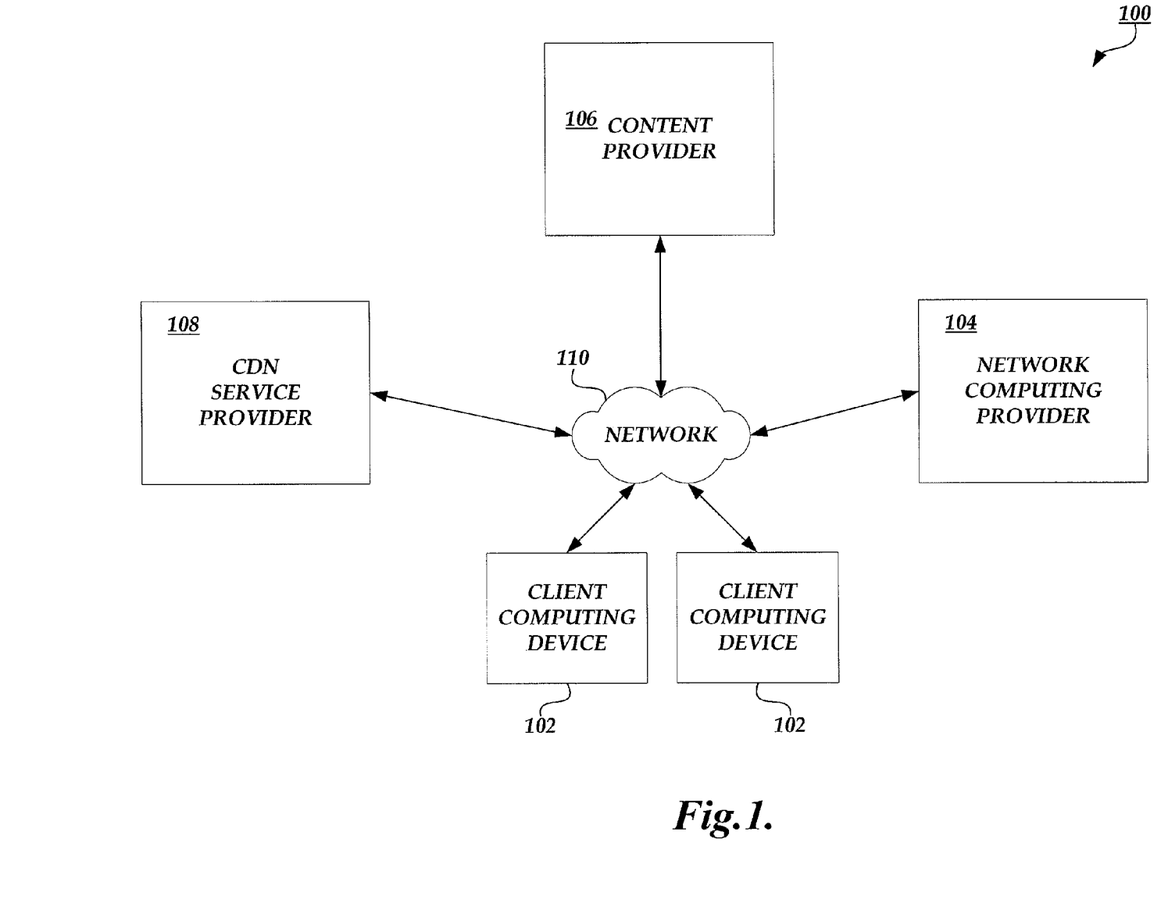
FIG. 1 is a block diagram illustrative of a content delivery environment including a number of client computing devices, a content provider, a content delivery network service provider, and a network computing provider.

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content from a content provider 106, content delivery network (CDN) service provider 108, or network computing provider 104. In an illustrative embodiment, the client computing devices 102 can correspond to a wide variety of computing devices including personal computing devices, laptop computing devices, hand-held computing devices, mobile devices (e.g., mobile phones, PDAs, tablet computing devices, electronic readers, etc.), wireless devices, various electronic devices and appliances for creating and/or consuming content, and the like. In an illustrative embodiment, the client computing devices 102 include necessary hardware and software components for establishing communications over a communication network 110. The client computing devices 102 may be equipped with networking equipment, wireless communication antennae, GPS components, and browser software applications that facilitate communications via the internet or an intranet. The client computing devices 102 may have varied local computing resources such as central processing units and architectures, memory, mass storage, graphics processing units, communication network availability and bandwidth, etc.

The network 110 can be any wired network, wireless network or combination thereof. In addition, the network 110 may be a personal area network, local area network, wide area network, cable network, satellite network, cellular telephone network, etc. or combination thereof. For example, a client computing device 102 can be configured to communicate over a wireless local area network (WLAN), Bluetooth-based personal area network (PAN), and a 3G/4G cellular telephone network.

The networked computing environment 100 can also include a content provider 106 in communication with the one or more client computing devices 102 or other service providers (e.g., CDN service provider 108, network computing provider 104, etc.) via the communication network 110. The content provider 104 illustrated in FIG. 1 corresponds to a logical association of one or more computing devices associated with a content provider. For example, the content provider 106 can include a web server component for obtaining and processing requests for content (such as web pages), an origin server for obtaining and processing requests for network resources from the CDN service provider 108, an application server for processing streaming content requests, etc. One skilled in the relevant art will appreciate that the content provider 106 can be associated with various additional computing resources, such as additional computing devices for administration of content and resources, DNS name servers, and the like.

The networked computing environment 100 can further include a CDN service provider 108 in communication with the one or more client computing devices 102 and other service providers via the communication network 110. The CDN service provider 108 illustrated in FIG. 1 corresponds to a logical association of one or more computing devices associated with a CDN service provider 108. Specifically, the CDN service provider 108 can include a number of Point of Presence (POP) locations that correspond to nodes on the communication network 110, a number of cache server computing devices for storing resources from content providers 106 and transmitting various requested resources to various client computing devices 102, etc.

The networked computing environment 100 can also include a network computing provider 104 in communication with the one or more client computing devices 102, the CDN service provider 108, and the content provider 106 via the communication network 110. The network computing provider 104 illustrated in FIG. 1 also corresponds to a logical association of one or more computing devices associated with a network computing provider 104. Specifically, the network computing provider 104 can include a number of POP locations that correspond to nodes on the communication network 110. Each POP can include a network computing component for hosting applications, such as data streaming applications, via a number of instances of a virtual machine, a number of storage devices for storing any type of data used in the delivery and processing of network or computing resources, including but not limited to user data, state information, processing requirements, historical usage data, and resources from a content provider 106, etc.

Figure 2:
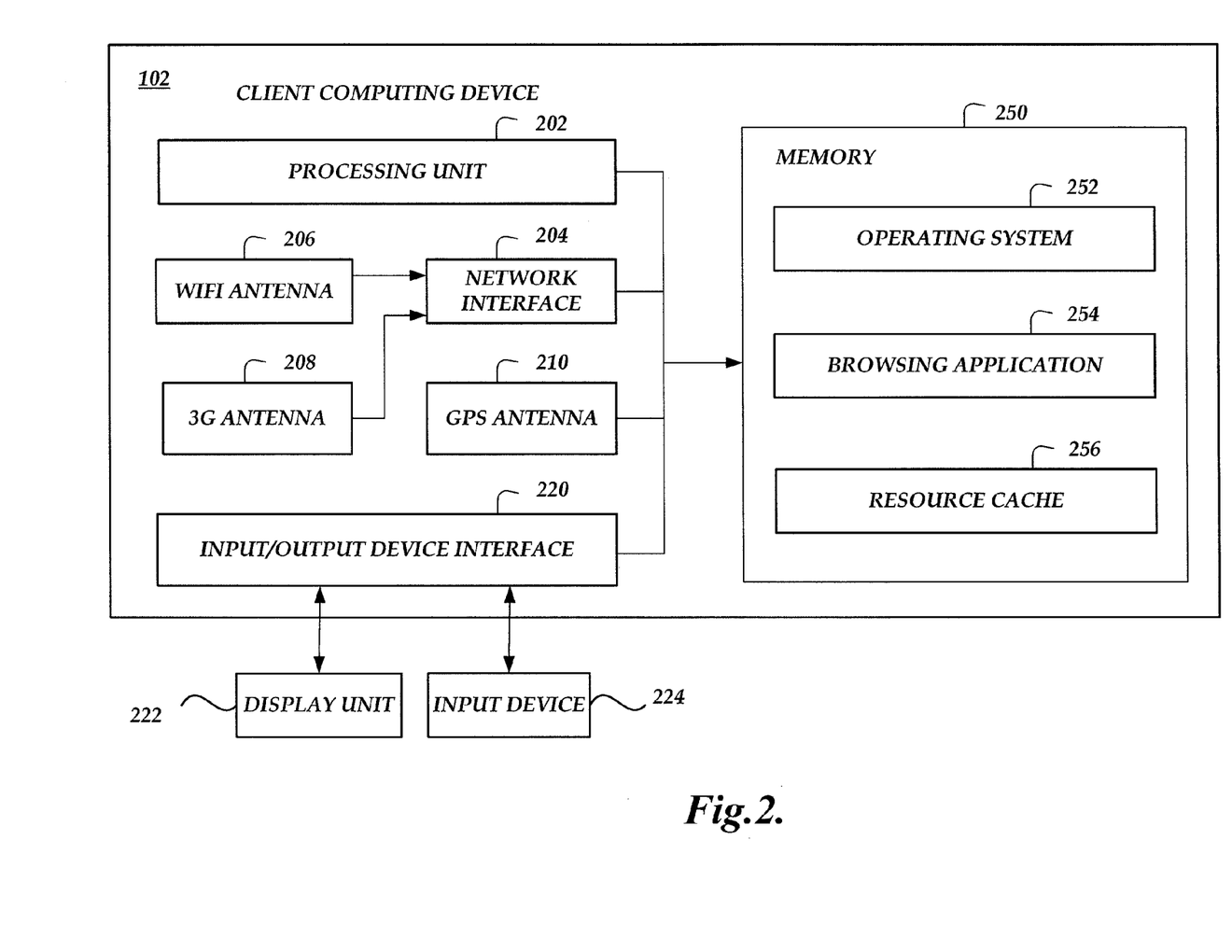
FIG. 2 is a block diagram illustrative of a client computing device of the content delivery environment of FIG. 1 illustrating the components of the client computing device.

Referring now to FIG. 2, one embodiment of a client computing device 102 is illustrated in detail. The client computing device 102 can be any of a number of computing devices that are capable of communicating over a communication network 110, including, but not limited to, a laptop, personal computer, personal digital assistant (PDA), hybrid PDA/mobile phone, mobile phone, electronic book reader, digital media player, tablet, etc. The client computing device 102 can comprise one or more processing units 202, a network interface 204, a GPS antenna 210, an input/output device interface 220, and a memory 250. The network interface 204 can provide connectivity to one or more networks or computing systems. In addition, the network interface can communicate over a WiFi antenna 206, a cellular telephone antenna 208, or any other wireless communication interface. The processing unit 204 can receive information and instructions from other computing systems or services via the network interface 204. The processing unit 202 can communicate to and from memory 250 and output information to a display 222 via the input/output device interface 220. The input/output device interface 220 can also accept input from an input device 224, such as a touch screen, keypad, keyboard, mouse, digital pen, voice activated input, headset, etc.

The memory 250 can contain computer program instructions that the processing unit 202 executes in order to implement one or more embodiments. The memory 250 can generally include RAM, ROM and/or other persistent or non-transitory memory. The memory 250 can store an operating system 252 that provides computer program instructions for use by the processing unit 202 in the general administration and operation of the client computing device 102. The memory 250 can further include computer program instructions and other information for implementing aspects of the present disclosure. For example, in one embodiment, the memory 250 includes a browsing application 254 and a resource cache 256. The browsing application 254 can request and receive network content from external devices, through the network interface 204, or from a resource cache 256. In some embodiments, the resource cache 254 can also be located within the memory space of the browsing application 254, on a separate computer readable medium drive such as a hard disk, etc.

In operation, the client computing device 102 can communicate with network computing providers 104 and other computing devices over the network 110, as described herein. The network interface 204 can facilitate such communication for the client computing device 102. Based on the instructions of the browser application 254 in memory 250, the client computing device 102 can request, receive, and process for display network content. The client computing device 102 can also receive, from the network computing provider 104, network content that was not requested, but rather was predicted, by the network computing provider 104, to have a likelihood of being requested that exceeds a threshold. The network content can be stored in the resource cache 256 until it is requested by the user of the client computing device 102, in which case the network content can be retrieved from the resource cache 256 rather than from a network computing provider 104 or other external content source. The client computing device 102 can also send metrics to the network computing provider 104. The metrics can include information about the location and direction of travel of the client computing device 102. Such information can be received from the GPS antenna 210 or another source of location and direction data. The metrics can also contain information about the current bandwidth of the client computing device's 102 active network connection.

With reference now to FIGS. 3-7, the interaction between various components of the networked computing environment 100 of FIG. 1 will be illustrated. Specifically, FIGS. 3-7 illustrate the interaction between various components of the networked computing environment 100 for the exchange of content between a client computing device 102 and a content provider 106 and/or CDN service provider 108 via the network computing provider 104. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 3:
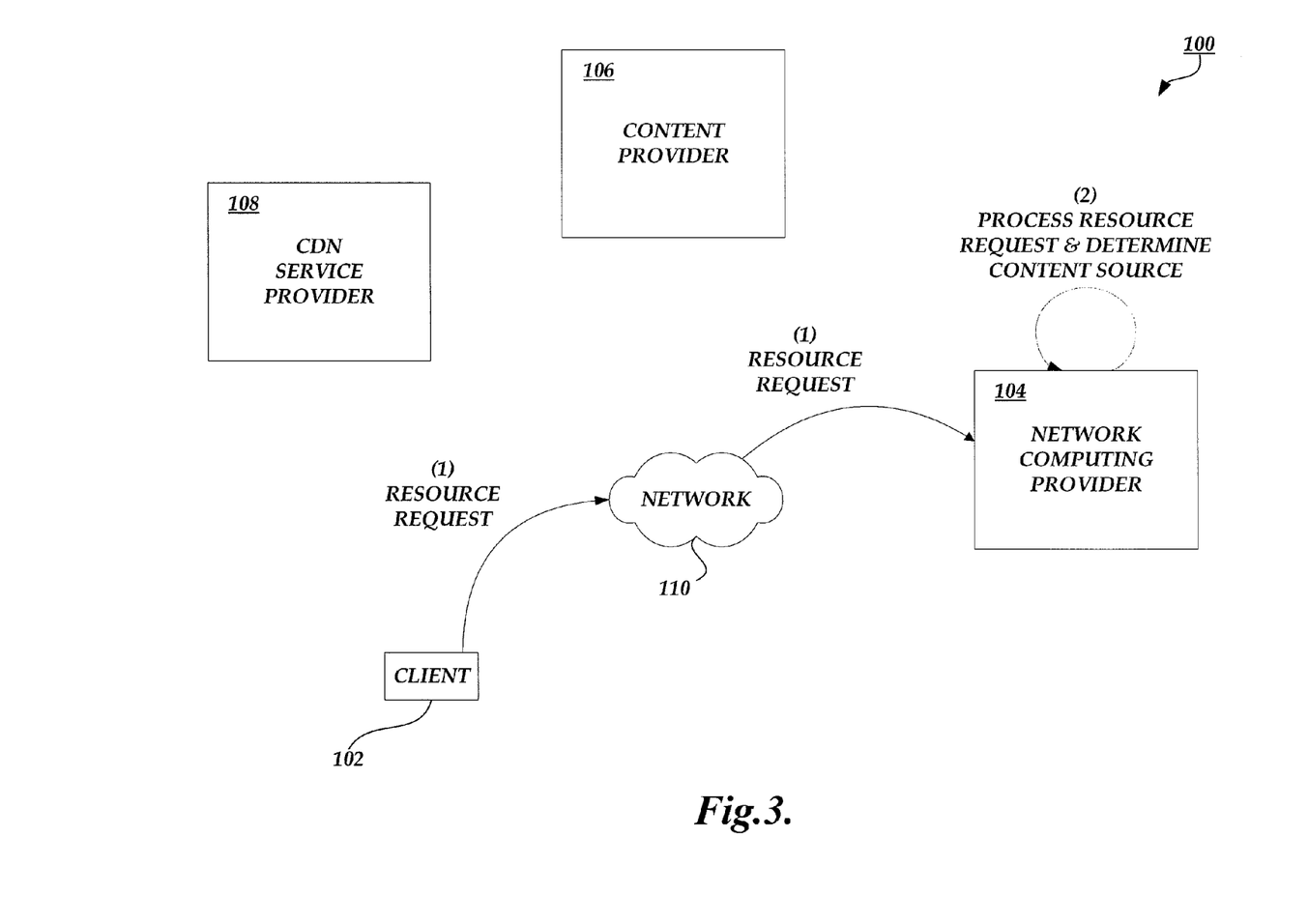
FIG. 3 is a block diagram of the content delivery environment of FIG. 1 illustrating the generation and processing of a request for a network resource from a client computing device to a network computing provider.

FIG. 3 is a block diagram of the content delivery environment 100 of FIG. 1 illustrating the generation and processing of a request for a network resource from a client computing device 102 to a network computing provider 104. The process can begin with the generation and processing of a network resource request from a client computing device 102 to a network computing provider 104. Illustratively, the client computing device 102 may load a browser, such as the browser application 254 illustrated in FIG. 2, for viewing network content in response to an event or user request. Subsequent to the browser being loaded, the browser may be utilized to request a new browse session. From the perspective of the user of the client computing device 102, the request for the new browse session corresponds to the initial request for network resources from, for example, one or more corresponding content providers 106. Illustratively, this request may be generated automatically as a result of the browser loading (e.g., a request for a default or "home" page), or may be generated as a result of a user following a link or entering a network address into an address bar. As illustrated in FIG. 3, the resource request is transmitted first to a network computing provider 104.

Subsequent to the receipt of the resource request, the network computing provider 104 may process the resource and select one or more content sources from which to retrieve the requested resource. In one embodiment, the network computing provider 104 may perform a DNS resolution on the request and determine that the requested resource is to be retrieved form a content provider 106, a CDN service provider 108, or some other content source. For example, a resource request may include a URL for a Web page, such as "http://www.xyzsite.com/default.htm." The network computing provider 104 may resolve the URL to an IP address through a DNS resolver associated with the network computing provider 104 (not shown), and may request the web page from the content provider 106 at the resolved IP address.

Figure 4:
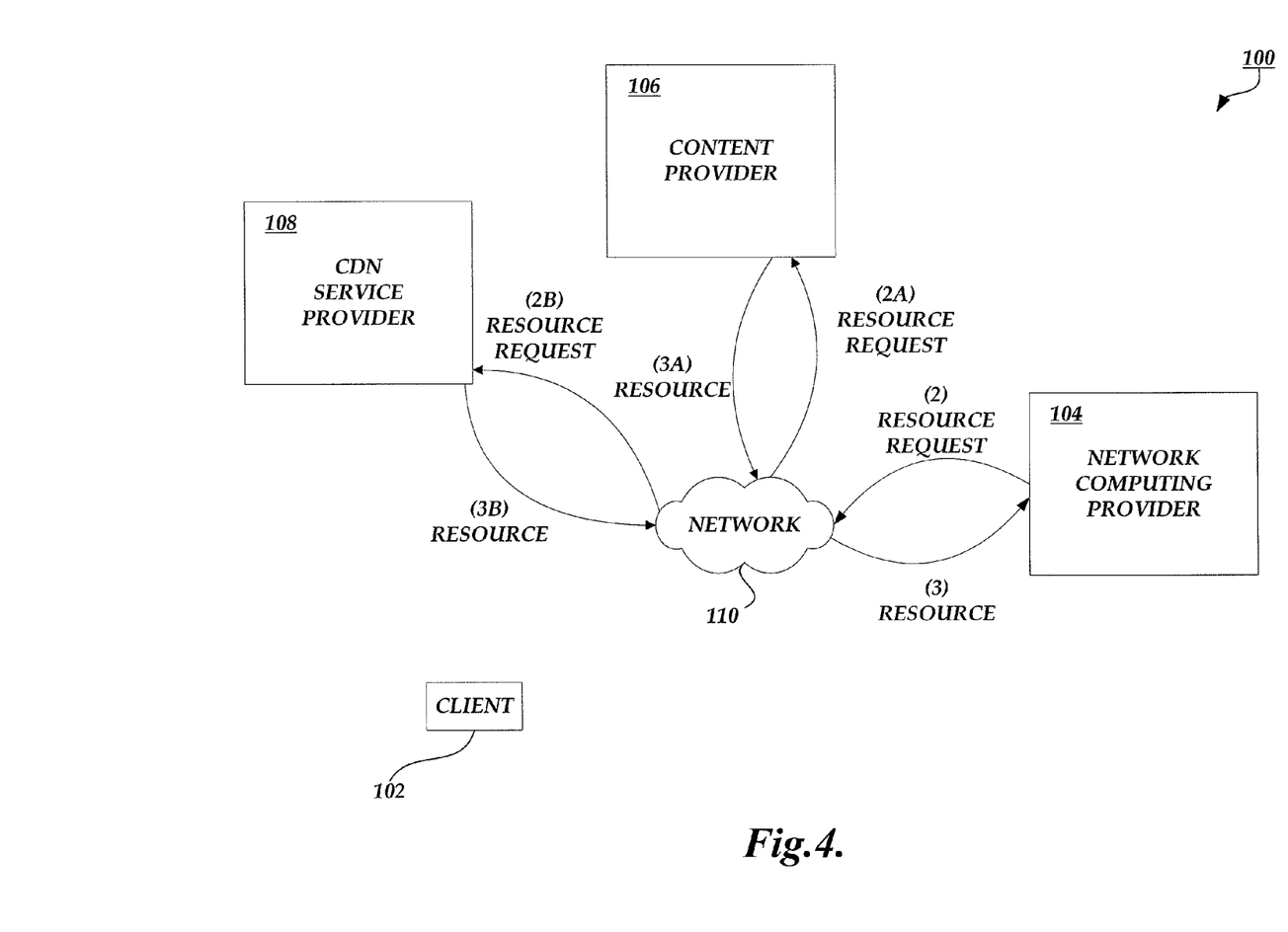
FIG. 4 is a block diagram of the content delivery environment of FIG. 1 illustrating the generation and processing of a request for a network resource from a network computing provider to one or more content sources.

With reference to FIG. 4, an illustrative interaction for generation and processing of a request for a network resource from a network computing provider 104 to multiple content providers 106 will be described. As illustrated in FIG. 4, the network computing provider 104 can provide a request for a network resource to a content provider 106 and/or a CDN service provider 108 based on a network address included in the browse session request. In various embodiments, a network resource may be retrieved from any combination of content providers 106, CDN service provider 108, or caches associated with the network computing provider 104. For example, the network computing provider 104 may determine whether a resource is stored in a local cache or in another server or service provider associated with the network computing provider 104. If a network resource is stored in a local or associated location, the network computing provider 104 may retrieve the network resource from the local or associated location rather than from the third party content provider 106 or CDN service provider 108. Illustratively, the network computing provider 104 may provide requests for any number of network resources as included in the resource request from the client computing device 102, and may obtain these network resources from any number of different sources, sequentially or in parallel.

As illustrated in FIG. 4, the content provider 106 receives the resource request from the network computing provider 104 and processes the request accordingly. In one embodiment, the content provider 106 processes the resource request as if it were originally provided by the client computing device 102. For example, the content provider 106 may select the type of content, ordering of content, or version of content according to the requirements of the requesting client computing device 102. In another embodiment, the content provider 106 may be provided with information that provides information associated with the network computing provider 104 for utilization in providing the requested content (e.g., an available amount of processing resources or network bandwidth).

Subsequent to obtaining the requested network resource from the content provider 106 (or other source designated by the content provider 106), the network computing provider 104 may process the network resource to extract embedded resource identifiers. For example, a network resource such as a web page may include embedded CSS style information and Javascript as well as embedded resource identifiers to additional resources such as text, images, video, audio, animation, executable code, and other HTML, CSS, and Javascript files.

Figure 5:
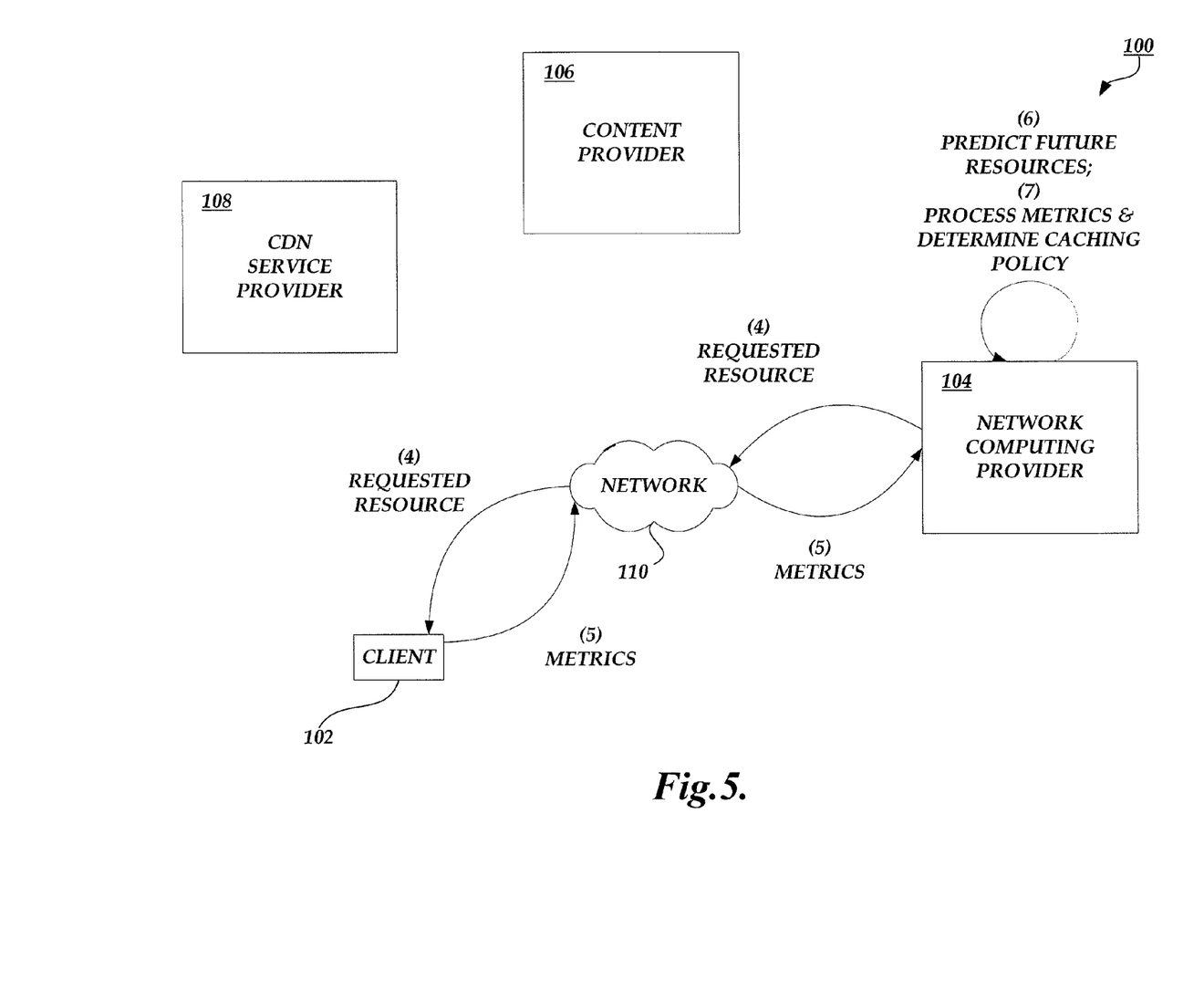
FIG. 5 is a block diagram of the content delivery environment of FIG. 1 illustrating the transmission of requested network content from a network computing provider to a client computing device, and the transmission of metrics from the client computing device to the network computing provider.

With reference to FIG. 5, an illustrative interaction for transmission of requested network content from a network computing provider 104 to a client computing device 102, and the transmission of metrics from the client computing device 102 to the network computing provider 104 will be described. As illustrated in FIG. 5, the network computing provider 104 may provide the requested resource to the client computing device 102 over the network 110 after retrieving it from one or more content sources. In some embodiments, when the network computing provider 104 is configured to perform a set of processing actions on requested content before transmitting it to the client computing device 102, an initial processing result is returned the client computing device 102 over the network 110.

Subsequent to receiving a requested network resource or an initial processing result, the client computing device 102 may perform any remaining processing actions in order to execute and/or display the requested resource. The client computing device 102 may then transmit metrics to the network computing provider 104. The metrics can include information about the location and direction of travel of the client computing device 102. Such information can be determined or received by the client computing device 102 by, for example, the GPS antenna 210 illustrated in FIG. 2. In some embodiments, the client computing device 102 can determine location and directional metrics through other means, such as through the use of a gyroscope, by receiving user input, by receiving data from a network service provider such as a cellular provider, etc. The metrics transmitted to the network computing provider 104 can also include a measurement of the bandwidth of the network connection that the client computing device 102 is currently utilizing.

In some embodiments, the metrics can be transmitted to the network computing provider 104 prior to the receipt or processing of the requested resource. For example, in some embodiments, information about the location, direction of travel, and/or bandwidth can be transmitted to the network computing provider 104 prior to, or concurrently with, a request for a network resource. In one example, metrics can be transmitted to the network computing provider 104 at predetermined or dynamically determined intervals, etc.

As illustrated in FIG. 5, the network computing provider 104 can predict or otherwise make a determination of which additional network resources will be requested by the client computing device 102 at a future time, for example in a subsequent request during the current browsing session. Illustratively, the predicted resources can be related to the previously requested resources. For example, when a user of a client computing device 102 requests a web page from a news web site, the network computing provider 104 can predict that the user is likely to request another web page from the same news site, or from another news site. The network computing provider 104 may maintain or have access to a data store containing information about previous requests of this user, of some group of users, of all users of the network computing provider 104, etc. The network computing provider 104 may use this data to determine browsing patterns. For example, when a user requests a particular web page from a news source, patterns in the prior request data may indicate that a likely resource to be requested in the future is a web page from a separate web site hosting financial information, rather than, or in addition to, another web page of the news web site, etc. The network computing provider 104 can then use the predictions in order to retrieve and cache the predicted network content, in some cases before it is requested by the client computing device 102. The cached content can be stored on the network computing provider 104 or at an intermediate network server in closer physical proximity to the client computing device 102. In some embodiments, the predicted content can additionally or alternatively be transmitted to a local cache of the client computing device 102.

Figure 9:
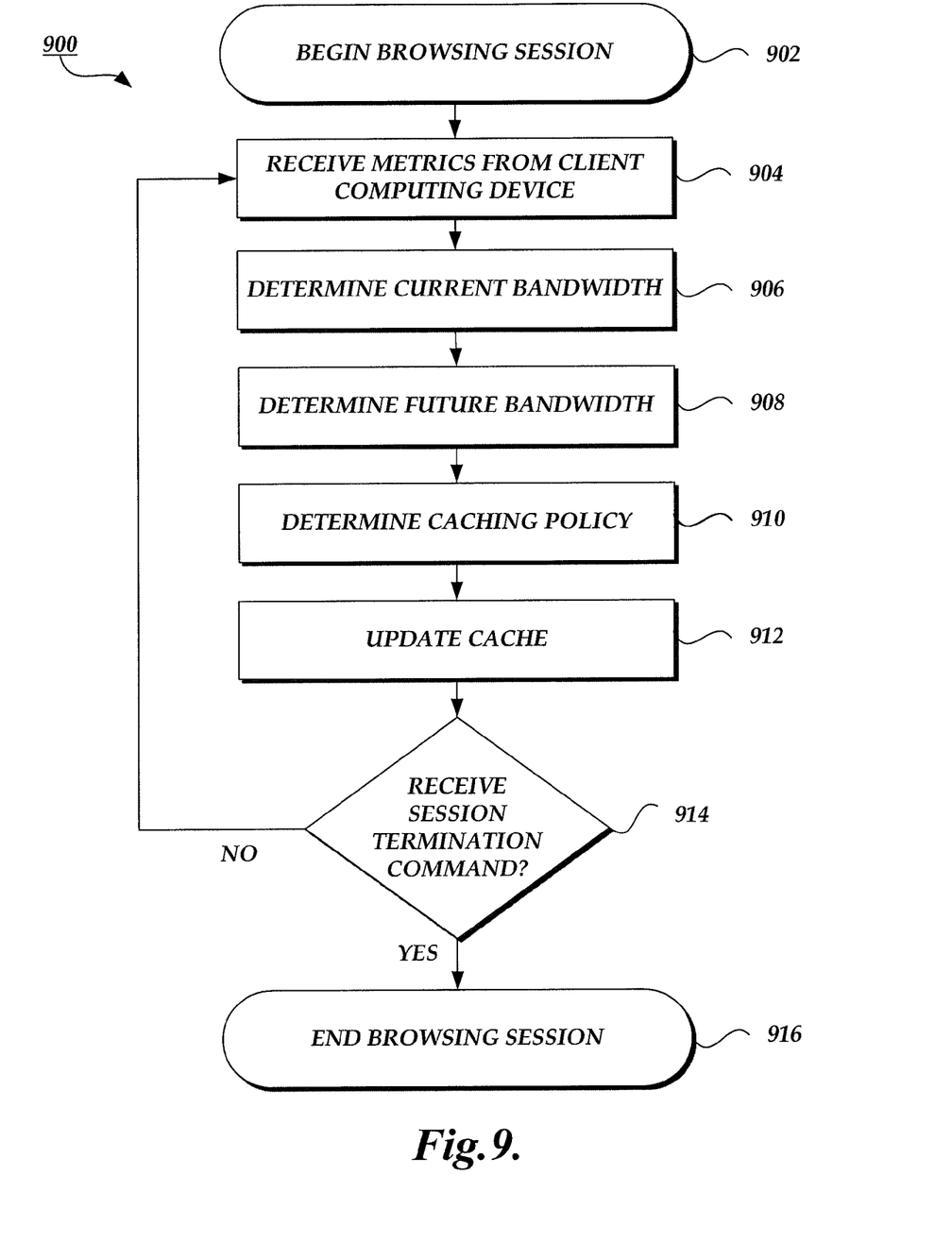
FIG. 9 is a flow diagram illustrative of a new browse session routine implemented by network computing provider.

The network computing provider 104 can also process the metrics received from the client computing device 102 in order to determine a caching policy, as described in detail with respect to FIG. 9. A caching policy can define where to physically store the cached content, how much cached content to store, how long to keep cached content in the storage area, what quality or compression level to apply to the cached content, etc. For example, the network computing provider 104 may receive metrics from the client computing device 102 indicating that the client computing device 102 is currently located in a high bandwidth area. In this example, a caching policy can be created or chosen which keeps the cached content physically stored at the network computing provider 104 in a high quality, uncompressed format. In some embodiments, the caching policy can define prioritization of caching. For example, a particular network resource may require high bandwidth to be transmitted to a client computing device 102 in a reasonable amount of time, even in a compressed state. Some areas may not provide adequate bandwidth, and prioritization in caching can be used to transmit the resource before the device gets to the low-bandwidth area, to discard the resource altogether and transmit only a placeholder, etc.

Figure 6:
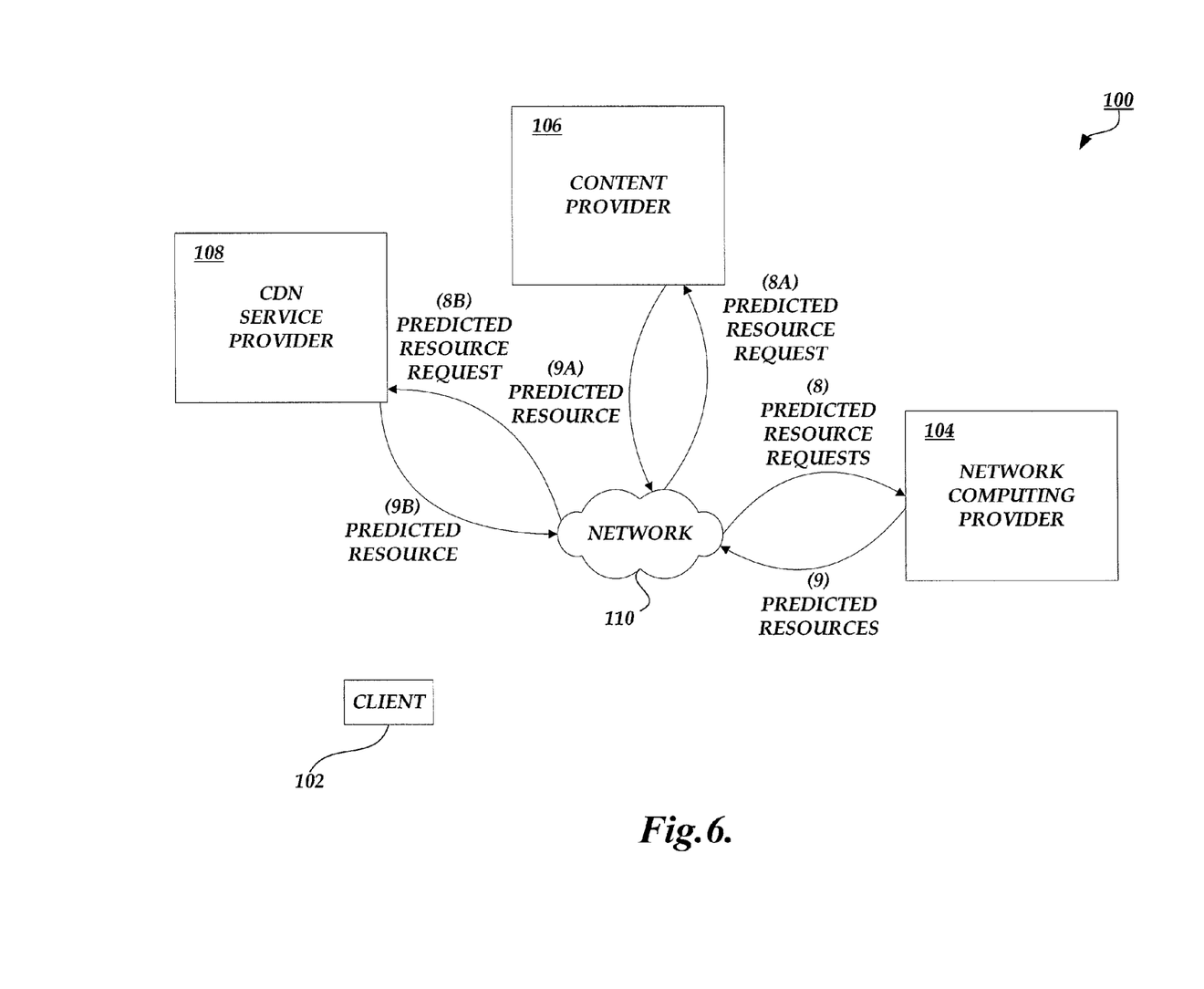
FIG. 6 is a block diagram of the content delivery environment of FIG. 1 illustrating the generation and processing of one or more requests corresponding to one or more predicted resources from a network computing provider to a content provider and content delivery network service provider.

With reference to FIG. 6, the generation and processing of one or more requests, corresponding to one or more predicted resources, from a network computing provider 104 to a content provider 106 and CDN service provider 108 will be described. As illustrated in FIG. 6, the network computing provider 104 can provide a request for a predicted network resource to a content provider 106 and/or a CDN service provider 108, in a manner similar that described with respect to FIG. 4. Illustratively, the network computing provider 104 may provide requests for any number of predicted network resources, as determined by an operating parameter or setting of the network computing provider 104 or client computing device 102, by the current caching policy, etc. Subsequent to obtaining the predicted requested network resource from the content provider 106 (or other source designated by the content provider 106), the network computing provider 104 may process the network resource to extract embedded resource identifiers and proceed to request those embedded resources. The network computing provider 104 can cache the predicted network resource and/or the embedded resources associated with it according to the current caching policy.

Figure 7:
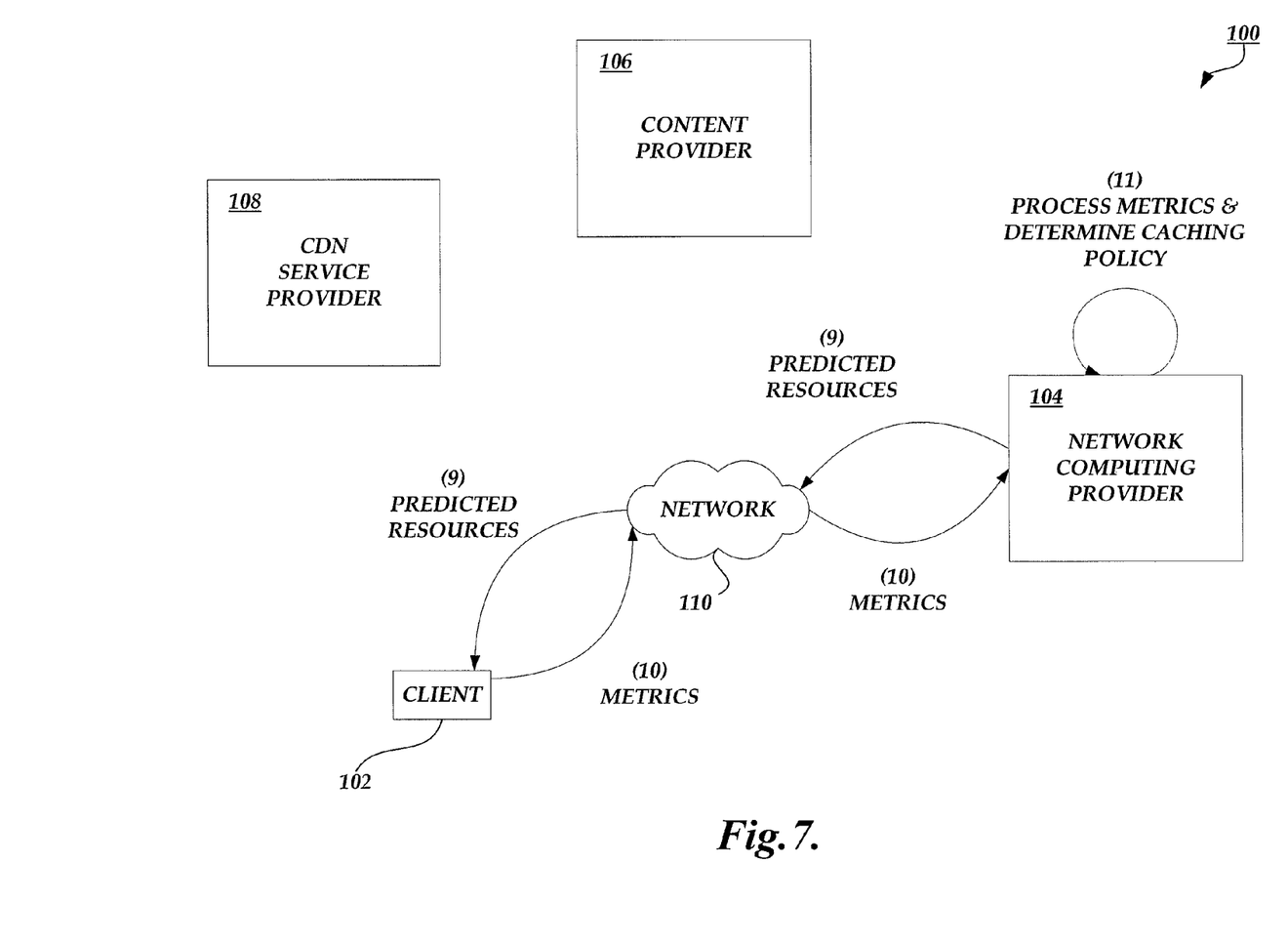
FIG. 7 is a block diagram of the content delivery environment of FIG. 1 illustrating the transmission of predicted network content from a network computing provider to a client computing device, and the transmission of metrics from the client computing device to the network computing provider.

With reference to FIG. 7, the transmission of predicted network content from a network computing provider 104 to a client computing device 102, and the transmission of metrics from the client computing device 102 to the network computing provider 104 will be described. When the caching policy indicates that some or all of the predicted network resources are to be cached on the client computing device 102, the resources can be transmitted to the client computing device 102 over the network 110. When the network computing provider 104 is configured to perform some processing actions to the content prior to transmission, or when the caching policy determines that the content is to be compressed or otherwise processed, the network computing provider 104 can perform those actions prior to transmission. As described above, the client computing device 102 can be configured to provide metrics to the network computing provider 104 in response to receiving content, at predetermined or dynamically determined intervals, etc.

In response to receiving new or updated metrics from the client computing device 102, the network computing provider 104 can modify or select a different caching policy. For example, the direction of travel of the client computing device 102 can indicate that it may soon leave a high bandwidth area and enter an area with limited bandwidth or no network availability. If the current caching policy keeps the cached content physically stored at the network computing provider 104 in high, uncompressed quality, the policy can be modified or another policy can be chosen. For example, a caching policy can be chosen in which the cached content is compressed and pushed to the client computing device 102 before the client computing device 102 leaves the high bandwidth area.

Figure 8:
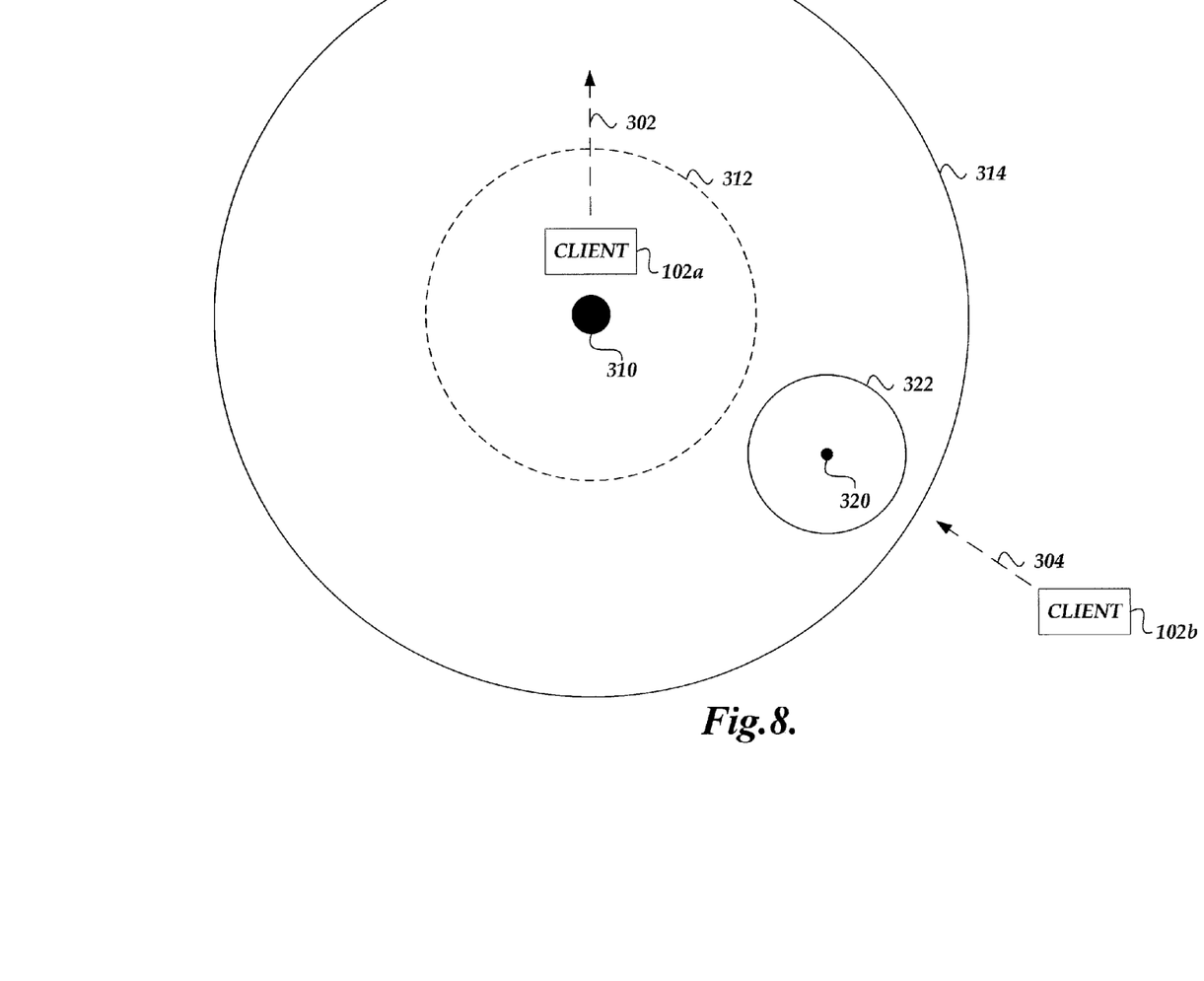
FIG. 8 is a coverage diagram illustrating the coverage areas of a number of wireless networks and a number of client computing devices operative to connect to the wireless networks.

FIG. 8 is a coverage diagram illustrating the coverage areas of two sample wireless network providers 310, 320 and two client computing devices 102a, 102b operative to connect to wireless networks. As described in detail above, the client computing devices 102a, 102b can establish a browsing session with one or more network computing providers 104. Utilizing the browsing sessions, the client computing devices 102a, 12b can request and receive network content from various content sources. The client computing devices 102a, 102b communicate with the network computing providers 104 through established networks, such as the internet. Mobile and other wireless devices can connect to the internet through wireless communication with wireless network providers 310, 320. For example, client computing device 102a can communicate with a cellular provider 310, such as a 3G or 4G cellular provider, to receive access to the internet and therefore to communicate with the network computing provider 104 or other content sources. In another example, client computing device 102b can communicate with a wireless hotspot 320 or any other WLAN or provider of broadband wireless internet access.

Illustratively, a client computing device 102a that is in communication with a cellular provider 310 can be located within a high-bandwidth area 312 or a low-bandwidth area 314. In some cases, the bandwidth provided by a cellular provider 310 is consistent and there is only one area; in other cases there can be 3 or more areas of different bandwidths. The client computing device 102a illustrated in FIG. 8 is initially located in the high-bandwidth coverage area 312 of the cellular provider 310. Likewise, a wireless hotspot 320 may have any number of areas in which connected devices experience different bandwidths. The sample wireless hotspot 320 illustrated in FIG. 8 has only one corresponding hotspot coverage area 322. While the bandwidth provided by a cellular provider 310 may be substantially lower than that of a wireless hotspot, such as wireless hotspot 320, the overall coverage area can be substantially larger. As illustrated in FIG. 8, the lower-bandwidth coverage area 314 of the cellular provider 310 can be substantially larger than the hotspot coverage area 322 provided by the wireless hotspot 320, and can cover many square miles, compared to a hotspot coverage area 322 that is typically less than one square mile.

The client computing device 102a can transmit metrics to the network computing provider 104 during the browsing session. For example, the client computing device 102a can transmit location data corresponding to the high bandwidth coverage area 312, and direction of travel data corresponding to direction 302. The network computing provider 104 can use this data to determine that the client computing device 102a currently has a relatively high level of bandwidth, and will soon enter an area 314 of lower bandwidth. With this information, the network computing provider 104 can create, alter, or select a caching policy for the browsing session which will give the client computing device 102b a superior browsing experience when compared to a caching policy based only on the current bandwidth of the client computing device 102a. In one embodiment, the network computing provider 104 can evict a larger portion of the cached content on the client computing device 102a than it would otherwise, and transmit a large amount of compressed content to the client computing device 102a while the device is still within the high-bandwidth area 312 of coverage, until it passes into the low-bandwidth coverage area 314 of the cellular provider 310. Such a caching policy can provide the client computing device 102a with a robust cache of predicted content already loaded on the client computing device 102a, so that it can be immediately accessed when it is requested without any further transmission necessary to and/or from the network computing provider 104.

Illustratively, client computing device 102b can initially be located outside the coverage area of any wireless network provider. As shown in FIG. 3, the client computing device 102b is traveling in direction 304, towards to the two wireless providers 310, 320. In response to entering the low-bandwidth area 314 of the cellular provider 310, the client computing device 102b can establish a browsing session and transmit metrics to a network computing provider 104. In this example, the metrics can indicate that the client computing device 102b is currently located within the low-bandwidth area 314, but is near a hotspot coverage area 322, provided by a wireless hotspot 320, which provides a broadband level of bandwidth, and that the client computing device 102b will soon enter the hotspot coverage area 322. The network computing component 104 can utilize this information to create a caching policy based on a broadband level of bandwidth, even though the client computing device 102b has a much lower bandwidth at the time. In one embodiment, the caching policy utilized by the network computing component 104 provides full-quality caching, rather than the compressed cache that was instituted for client computing device 102a. Additionally, the cached content may be stored in a cache on the network computing provider 104, because when it is requested by the client computing device 102b, the broadband connection facilitates rapid transmission of the content to the client computing device 102b.

In another example, the client computing device 102a of FIG. 8 is traveling in direction 302, and may eventually travel for a time outside of any coverage area until it reaches a new coverage area (not shown). The network computing provider 104 can determine another network computing provider 104 or other network component that is in closer physical proximity to the new coverage area, and update the caching policy such that cached content is stored that closer network component and available when the client computing device 102 enters the new coverage area. Factors that the network computing provider can consider when determine whether to utilize such a caching policy can include physical distance that the device is travelling outside of any known coverage area, the time that the client computing device is expected to be without coverage, etc. When these measurements exceed some threshold, the network computing provider 104 can choose a caching policy that caches resources at a network component in closer physical proximity to the predicted future location of the client computing device 102.

FIG. 9 is a flow diagram illustrating a routine 900 implemented by a network computing provider 104 for determining caching policies. The routine 900 can begin at block 902, where the network computing provider 104 receives a notification from a client computing device 102 to begin a browsing session. During the course of a browsing session, the client computing device 102 can request network resources, such as web pages, from the network computing provider 104. As described above, the network computing provider 104 can retrieve the requested web pages from any number of content sources, perform certain processing actions on the retrieved web pages, and transmit the web pages to the client computing device 102. The network computing provider 104 can predict which network resources will be requested in the future, for example during the same browsing session, and retrieve those resources for caching. In some embodiments, the requested resources are cached instead of, or in addition to, predicted resources. For example, if a client computing device 102 requests a video file, the video can be cached at the network computing provider 104 and streamed to the client computing device 102 to minimize the delay between the request and playback. Alternatively, the video file can be cached at the client computing device 102 in full or compressed quality, depending on the current caching policy. The network computing provider 104 can use metrics received from the client computing device 102 to determine which caching policy to utilize.

At block 904, the network computing provider 104 receives metrics from the client computing device 102. The client computing device 102 can send metrics at predetermined or dynamically determined intervals. In some embodiments, the client computing device 102 can send metrics with its requests for network resources. In some embodiments, the network computing provider 104 can initiate a request for metrics from the client computing device 102. In response to receiving the metrics, the routine 900 can proceed to block 906.

In some embodiments, the network computing provider 104 can receive metrics from the client computing device 102 independent of any other process, e.g.: without proceeding to block 906. For example, the network computing provider 104 may store the metrics for future analysis or other use, etc. In some embodiments, the network computing provider 104 can receive metrics from the client computing device 102 while the network computing provider 104 is performing actions corresponding to other blocks of the routine 900. In such cases, the network computing provider 104 can process subsequent blocks of the routine 900 in parallel, queue the metrics for processing after the previously received metrics have been processed, store the metrics without processing them, etc.

At block 906, the network computing provider 104 can begin to process the metrics. For example, the network computing provider 104 can determine the current bandwidth of the client computing device's 102 network connection. A measurement of the bandwidth can be included in the metrics received from the client computing device 102, or can be calculated or otherwise determined from the metric information. In some embodiments, the network computing provider 104 can determine the current bandwidth without analyzing the metrics received from the client computing device 102. For example, the network computing provider 104 can insert executable code into the requested resources, and the executable code can perform operations at the client computing device 102, such as making sample network request. The results of these operations can indicate the network bandwidth of the client computing device's 102 current network connection.

At block 908, the network computing provider 104 can determine the future bandwidth of the client computing device 102. In one embodiment, this determination is based on location and directional metrics received from the client computing device 102. For example, the client computing device 102 may be configured with a GPS antenna or other components for determining its current physical location, its direction of travel, its speed of travel, and the like. The client computing device 102 can transmit this information to the network computing provider 104, for example in block 904 above, and the network computing provider 104 can use this information to predict one or more future locations of the client computing device 102.

The network computing provider 104 can have access to a coverage map indicating the available bandwidth at different locations of the network to which the client computing device 102 is connected, and can use this map to determine the bandwidth at the future location of the client computing device 102. In some embodiments, the network computing provider 104, either alone or in conjunction with other network components, can build or modify the coverage map based on the bandwidth determinations made in block 906 and the location metrics received from client computing devices 102. Such a coverage map can be universal, e.g.: can apply to all client computing devices 102 even if they are unrelated, or can be tailored to an individual or group of client computing devices 102. For example, certain client computing devices 102 may access private networks that other client computing devices 102 do not have access to, such as a WLAN in an office park, etc. The coverage map can include multiple networks and can indicate where they overlap. For example, when a client computing device 102 has access to a broadband WLAN in an office park, the client computing device 102 may also have access to a cellular network in the same physical location. The cellular network may have a lower bandwidth than the WLAN, but can typically provide a larger total coverage area. This can result in a client computing device 102 that begins a browsing session while connected to a WLAN, and then leaves the WLAN coverage area, switching to the cellular network during the same browsing session. In some embodiments, access to the coverage map, in textual, graphical, or another form, can be provided to client computing devices 102. For example, a user of a client computing device 102 can consult the coverage map before travelling to determine which route offers the best bandwidth, where areas of low or zero bandwidth are, etc.

At block 910, the network computing provider 104 can determine a caching policy in response to determining, for example, the current and future bandwidth available to the client computing device 102. The caching policy can be selected from a predefined set of caching policies, can be created based on the metrics and other operating parameters of the specific client computing device 102 and current browsing session, can be selected from a predefined set and customized for the current browsing session, etc. The caching policy can define, for example, where to cache resources. In some embodiments, resources can be cached at the network computing provider 104, the client computing device 102, another network component, or any combination thereof. The caching policy can also define the compression to apply, if any, to the cached resources. In some cases, for example, a web page may contain images, and those images may have a resolution that is much higher than necessary for a client computing device 102 that is a cell phone. In such as case, the images can be scaled down to a resolution appropriate for a cell phone. Scaling down the images can also reduce the time it takes to download the file to the client computing device 102.

At block 912, the network computing provider can update the cache according to the caching policy determined in block 910. For example, if a previous caching policy called for cached content to be stored at the network computing provider 104, and new caching policy, as determined in block 910, calls for the cached content to be stored at the client computing device 102, then the network computing provider 104 can transmit the cached content to the client computing device 102. In another example, if a previous caching policy called for cached content to be stored in uncompressed format and the newly effective caching policy calls for content to be compressed, the network computing provider 104 can compress the content or cause the content to be compressed. In yet another example, if the previous caching policy called for 25 predicted resources to be cached for 1 day, and a newer caching policy calls for 100 predicted resourced to be cached for 2 hours, then in some cases the majority of the existing cache can be evicted (if the resources have been in cache for longer than 2 hours), and a large number of newly predicted resources can be retrieved and cached.

At decision block 914, the network computing provider 104 can determine whether the browsing session is still active. If a termination command or similar notification has been received from the client computing device 102, the network computing provider 104 can proceed to block 916, where the browsing session ends. In some embodiments, there may not be a termination command or other notification from a client computing device 104. In such case, the network computing provider 104 can determine that the browsing session has ended after a period of time has passed without any communication from the client computing device 102. In some embodiments, the network computing provider 104 can attempt to communicate with the client computing device 102 to determine whether the browsing session has ended.

If the browsing session has not ended, execution of the routine 900 can return to block 904, where metrics are received from the client computing device. In some embodiments, metrics are received continuously throughout the browsing session. In some embodiments, metrics may not be received from the client computing devices 102 for a long period of time, even though the browsing session remains active. The routine 900 can be implemented such that the network computing provider 104 will wait to receive metrics before continuing execution, although alternative execution paths are possible.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow location and/or bandwidth based caching in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Depending on the embodiment, certain acts, events, or functions of any of the algorithms or program routines described herein can be performed in a different sequence, can be added, merged, or left out all together (e.g., not all described acts or events are necessary for the practice of the routine). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for caching network content, the system comprising:
   a network computing component comprising computing hardware configured to execute specific instructions, the network computing component configured to:
   receive, from a client computing device configured with a wireless internet connection, a request for a web page;
   in response to receiving the request:
     predict a web page that will be requested in the future, the prediction based at least in part on the received web page request; and
     cache the predicted web page according to a first caching policy;
   receive a plurality of metrics from the client computing device, wherein the plurality of metrics comprises at least a location and a direction of travel of the client computing device;
   determine a current bandwidth of the client computing device;
   determine a future bandwidth of the client computing device based at least in part on the location and the direction of travel of the client computing device;
   determine whether a difference between the current bandwidth and the future bandwidth exceeds a threshold;
   in response to determining that the difference exceeds the threshold, process the predicted web page cached under the first caching policy according to a second caching policy, wherein the second caching policy specifies a higher compression level than the first caching policy for processing of the predicted web page; and
   transmit a processed result of the predicted web page, according to the second caching policy, to the client computing device.

2. The system of claim 1, wherein the wireless internet connection is one of a cellular connection, a WLAN connection, or a Bluetooth connection.

3. The system of claim 1, wherein the future bandwidth is less than the current bandwidth and the second caching policy comprises caching an increased number of predicted web sites at a lower quality than the first caching policy.

4. The system of claim 1, wherein the future bandwidth is greater than the current bandwidth and the second caching policy comprises caching predicted web sites at a higher quality than the first caching policy.

5. The system of claim 1, wherein the prediction is further based at least in part on historical web page requests.

6. Non-transitory physical computer storage comprising instructions stored therein for implementing, by a network computing device, operations for caching network content, the operations comprising:
   establishing a network connection with a client computing device, wherein the network connection comprises a first bandwidth;
   determining a first caching policy, wherein the first caching policy is based at least in part on the first bandwidth;
   caching a predicted network content according to the first caching policy, wherein the predicted network content is predicted to be accessed by the client computing device at a future time, and wherein the predicted network content is based at least in part on a network content request received from the client computing device;
   analyzing a plurality of metrics to determine a second bandwidth, wherein the plurality of metrics comprises at least a current location and a direction of travel of the client computing device, and wherein the network connection of the client computing device is determined to have the second bandwidth at the future time;
   determining a difference between the first bandwidth and the second bandwidth;
   determining a second caching policy that specifies a higher compression level than the first caching policy for processing of the predicted network content when the difference between the first bandwidth and the second bandwidth indicates that the second bandwidth is lower than the first bandwidth;
   processing, according to the second caching policy, the predicted network content cached under the first caching policy; and
   caching a processed result of the predicted network content according to the second caching policy.

7. The non-transitory computer storage of claim 6, wherein the network content comprises at least one of a web page, movie, image, applet, or document.

8. The non-transitory computer storage of claim 6 wherein the first bandwidth is a range of bandwidths and wherein the second bandwidth is a range of bandwidths.

9. The non-transitory computer storage of claim 6, wherein the predicted network content is further based on historical requests for network content.

10. The non-transitory computer storage of claim 9, wherein the historical requests for network content were received from a plurality of client computing devices.

11. The non-transitory computer storage of claim 6, wherein the second bandwidth is less than the first bandwidth, and wherein the second caching policy comprises caching at least some predicted network content at a lower quality than the first caching policy.

12. The non-transitory computer storage of claim 6, wherein the second bandwidth is greater than the first bandwidth, and wherein the second caching policy comprises caching predicted network content at a higher quality than the first caching policy.

13. The non-transitory computer storage of claim 6, the operations further comprising:
predicting a future location of the client computing device based at least in part on the current location and the direction of the travel of the client computing device.

14. The non-transitory computer storage of claim 13, the operations further comprising:
determining a network computing provider with a physical location that is within a threshold distance of the future location of the client computing device; and
caching predicted network content at the network computing provider.

15. A computer-implemented method for caching network content, executed by a network computing device, the method comprising:
establishing a network connection with a client computing device, the network connection comprising a first bandwidth;
caching network content according to a first caching policy, wherein the cached network content is predicted to be accessed by the client computing device at a future time and wherein the first caching policy is based at least in part on the first bandwidth;
analyzing a plurality of metrics to determine a second bandwidth, wherein the plurality of metrics comprises at least a direction of travel of the client computing device, and wherein the network connection of the client computing device is determined to have the second bandwidth at the future time;
determining a difference between the first bandwidth and the second bandwidth;
determining a second caching policy that specifies a higher compression level than the first caching policy for processing of the predicted network content when the determined difference between the first bandwidth and the second bandwidth indicates that the second bandwidth is lower than the first bandwidth;
processing, according to the second caching policy, the network content cached under the first caching policy; and
caching a processed result of the predicted network content according to the second caching policy.

16. The computer-implemented method of claim 15, wherein the plurality of metrics further comprises a location the client computing device.

17. The computer-implemented method of claim 16, wherein the determining a second bandwidth comprises predicting a second location of the client computing device based at least in part on the location and the direction of travel.

18. The computer-implemented method of claim 17, wherein the determining a second bandwidth further comprises accessing historical data of the bandwidth at the second location.

19. The computer-implemented method of claim 18, wherein the historical data of the bandwidth at the second location is received from a plurality of client computing devices.

20. The computer-implemented method of claim 15, wherein predicting the content to be accessed at a future time comprises analyzing historical requests for network content.

21. The computer-implemented method of claim 20, wherein the historical requests for network content were received from a plurality of client computing devices.

22. The computer-implemented method of claim 15, wherein the network content comprises at least one of a web page, movie, image, applet, or document.

23. A system for caching network content, the system comprising:
a data store configured to store specific computer-executable instructions;
a network computing component comprising computing hardware configured to execute the specific computer-executable instructions to:
establish a network connection with a client computing device, the network connection comprising a first bandwidth;
cache network content according to a first caching policy, wherein the cached network content is predicted to be transmitted to the client computing device at a future time and wherein the first caching policy is based at least in part on the first bandwidth;
analyze a plurality of metrics to determine a second bandwidth, wherein the plurality of metrics comprises at least a direction of travel of the client computing device, and wherein the network connection of the client computing device is determined to have the second bandwidth at the future time;
determine a difference between the first bandwidth and the second bandwidth;
determine a second caching policy that specifies a higher compression level than the first caching policy for processing of the predicted network content when the determined difference indicates that the second bandwidth is lower than the first bandwidth;
process, according to the second caching policy, the network content cached under the first caching policy; and
cache a processed result of the predicted network content according to the second caching policy.

24. The system of claim 23, wherein the plurality of metrics further comprises a location of the client computing device, and wherein the determining a second bandwidth comprises predicting a second location of the client computing device based at least in part on the location and the direction of travel of the client computing device.

25. The system of claim 23, wherein the determining a second bandwidth further comprises accessing historical data of the bandwidth at the second locations.

26. The system of claim 25, wherein the historical data of the bandwidth at the second location is received from a plurality of client computing devices.

27. The system of claim 23, wherein predicting the content to be accessed at a future time comprises analyzing historical requests for network content.

28. The system of claim 27, wherein the historical requests for network content were received from a plurality of client computing devices.

* * * * *